May 6, 1941.  G. W. STEWART  2,240,631
PERCH FOR BIRD CAGES
Filed April 8, 1940
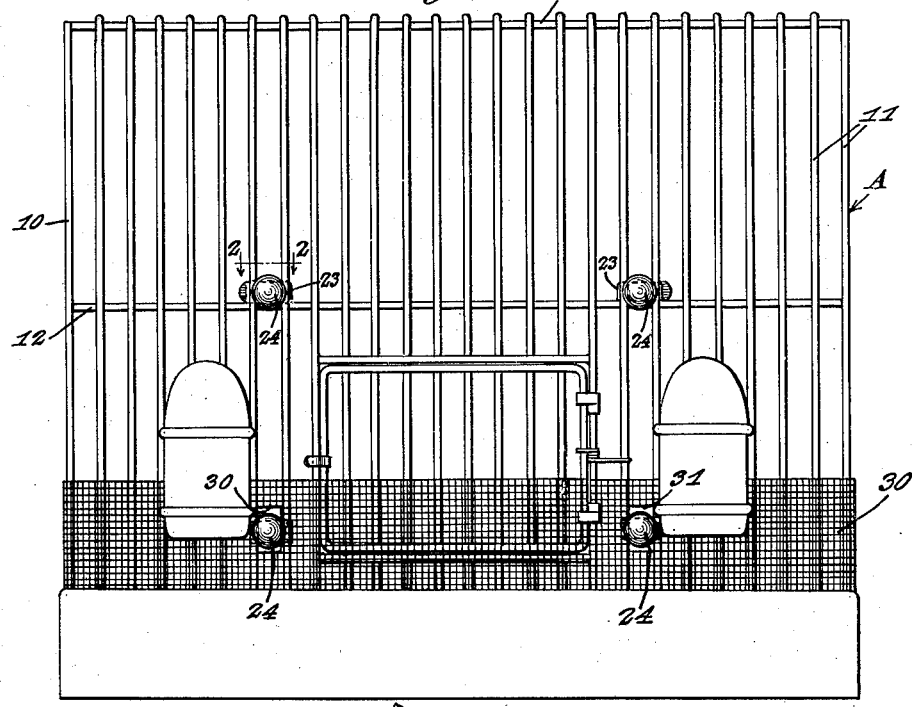
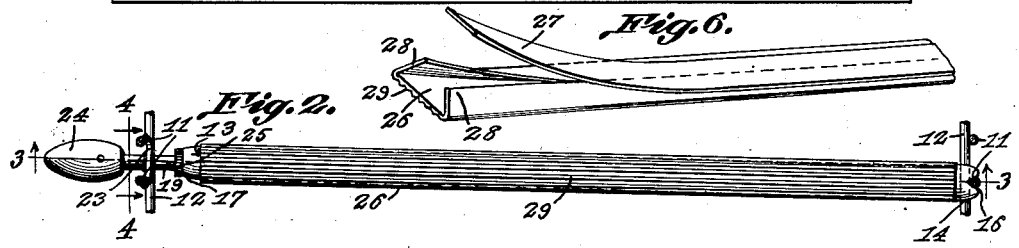
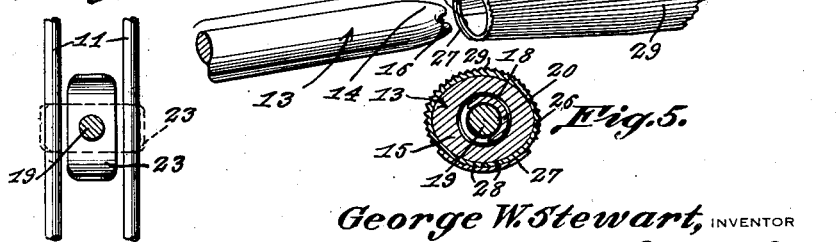
George W. Stewart, INVENTOR
BY Victor J. Evans & Co.
ATTORNEYS Patented May 6, 1941

2,240,631

UNITED STATES PATENT OFFICE 2,240,631

PERCH FOR BIRD CAGES

George W. Stewart, West Los Angeles, Calif.

Application April 8, 1940, Serial No. 328,535

4 Claims. (Cl. 119—26)

The invention relates to a perch and more especially to bird cage perches.

The primary object of the invention is the provision of a perch of this character wherein a removable cover is a part thereof and such cover is of a construction so that a number of the same can be stacked, wrapped or packaged for convenient shipping and these covers assure cleanliness and comfort for caged birds as well as a saving of time for an attendant in that the cover can be readily placed in position for use and removed with dispatch.

Another object of the invention is the provision of a perch of this character wherein the cover arrangement is primarily to eliminate the bothersome task of washing or scraping the perch as the latter can be kept in a sanitary condition and will not inflict injury to the bird and resulting in perfect comfort to the latter when caged.

A further object of the invention is the provision of a perch of this character, which is simple in its construction, readily and easily positioned in a bird cage, conveniently removed for the cleaning of such perch, thoroughly reliable and efficient in its operation, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention and pointed out in the claims hereunto appended.

In the accompanying drawing:

Figure 1 is an elevation of a bird cage with several perches arranged therein, each constructed in accordance with the invention.

Figure 2 is a fragmentary sectional view taken on the line 2—2 of Figure 1 looking in the direction of the arrows.

Figure 3 is a sectional view on the line 3—3 of Figure 2 looking in the direction of the arrows.

Figure 4 is a sectional view on the line 4—4 of Figure 2 looking in the direction of the arrows.

Figure 5 is a sectional view on an enlarged scale taken on the line 5—5 of Figure 3.

Figure 6 is a fragmentary perspective view of the cover partly completed.

Figure 7 is a fragmentary exploded perspective view of the supporting stick and cover therefor of a perch, these being arranged relative to each other for interfitting of the same.

Similar reference characters indicate corresponding parts throughout the several views in the drawing.

Referring to the drawing in detail, A designates generally a bird cage having the wire body 10, which includes the upstanding and horizontally arranged wires 11 and 12, respectively, the said body being of conventional construction and the cage is merely illustrated for the purpose of exhibiting the use of the perches constituting the present invention and hereinafter fully described.

Each perch, there being four shown in association with the cage A, comprises a stick or shaft-like member 13 having a gradually reduced end 14, which in cross section is of substantially oval formation compared with the major rounded cross sectional formation 15 of said stick or shaft. This end 14 is provided with a notch 16 for the seating of a wire 11 therein when the perch in its entirety is mounted within the cage A. The other end 17 of the stick or shaft 13 is centrally bored or socketed at 18 for slidably accommodating a plunger 19 about which surrounds a coiled compression spring 20 seated against an internal shoulder 21 within the said stick or shaft and against an abutment 22 on the plunger 19 for effecting the extension of the latter.

The plunger 19 is built with a clip in the form of a saddle piece 23 for engaging a pair of adjacent wires 11 of the frame or body 10 of the said cage. In this manner, that is to say, the engaging of one wire 11 in the notch 16 and several wires 11 in the clip 23, the perch in its entirety will become fixedly mounted within the body 10 of the cage A and is susceptible of convenient release therefrom.

Outwardly of the plunger 19 is a finger gripping knob 24 so as to permit easy manipulation of the plunger for separating or disengaging the clip 23 from the wires 11 saddled thereby. When the clip 23 has become disengaged, the plunger 19 can be turned clockwise to have the clip 23 clear the wires 11 adjacent to each other, which were previously engaged by said clip, and thus this clip can be withdrawn from the body 10 in the space between said wires and concurrently therewith the perch in its entirety.

The end 17 of the bore 18 is equipped with a guide sleeve 25 screwed therein for the plunger 19 and said sleeve 25 forms an abutment for the shoulder 22 to limit the outward movement of the said plunger under the action of the spring 20 coiled about said plunger. The spring 20 urges the clip 23 into latching engagement as before set forth.

The sleeve 25 retains the plunger 19 assembled with the stick or shaft 13 and is of a removable type.

Adapted to envelop the stick or shaft 13 is a removable cover involving the fibrous, striplike sections 26 and 27, respectively. The section 26 at opposite longer edges thereof, being of elongated formation, is folded on itself and adhering to these folds 28 is the section 27. The cover normally is flattened and susceptible of being spread into a tubular formation so that the stick or shaft 15 can be introduced into the same to have the cover envelop the latter, as is clearly shown in Figure 2 of the drawing. The flattened condition of the cover enables a number of these to be stacked and packaged for shipment and consumption. The cover when soiled is removed from the stick or shaft and a new cover placed thereon. In this manner the perch will be thoroughly sanitary and can be maintained clean in the use thereof.

The section 26 at its outer face is provided with a corrugated tread surface 29 for antiskid purposes and also to enable the sharpening of the bird's beak or bill when the perch is in service within the body 10 of the cage A.

The cover can be made of any suitable material, preferably being constructed from paper stock. When the cover becomes unfit for use, it can be discarded and such cover is susceptible of easy removal and is readily positioned for enveloping the stick or shaft, the perch being of novel construction in its entirety.

As is conventional, the cage A has arranged exteriorly thereof adjacent to its bottom a splash screen 30 and at determined intervals in this splash screen are provided elongated openings 31 for accommodating the lowermost perches when used in the cage. The perches thus used have their knob ends 24 protruding outwardly with respect to these openings 31.

The horizontal wire 12 of the cage coacts with the upper perches so as to create a bearing for these to prevent the lowering thereof when the said perches are within the cage, this being clearly shown in Figure 1 of the drawing. The lowermost perches will rest against the bottom end of each opening 31 so that these will not become lowered in the use thereof within the cage.

What is claimed is:

1. A perch of the kind described comprising a stick having a notched end, an extensible saddling clip fitted with the other end of said stick and having a handle outside of the said clip, and a replaceable covering for enveloping said stick.

2. A perch of the kind described comprising a stick having a notched end, an extensible saddling clip fitted with the other end of said stick and having a handle outside of the said clip, a replaceable covering for enveloping said stick, and means applying tension to said clip for the automatic extending thereof relative to the stick.

3. A perch of the kind described comprising a stick having a notched end, an extensible saddling clip fitted with the other end of said stick and having a handle outside of the said clip, a replaceable covering enveloping said stick, and means applying tension to said clip for the automatic extending thereof relative to the stick, the said covering including striplike sections, one being folded and having the other section joined with said folds for effecting tubular formation covering the perch.

4. A perch of the kind described comprising a stick having a notched end, an extensible saddling clip fitted with the other end of said stick and having a handle outside of the said clip, a replaceable covering for enveloping said stick, means applying tension to said clip for the automatic extending thereof relative to the stick, the said covering including striplike sections, one being folded and having the other section joined with said folds for effecting tubular formation covering the perch, the said covering being normally flat, and a tapered formation on said stick for easy insertion thereof into the covering.

GEORGE W. STEWART.